United States Patent
Strobl et al.

[15] 3,666,990
[45] May 30, 1972

[54] OVERLOAD PROTECTOR FOR ELECTRIC MOTORS WITH BRUSHES

[72] Inventors: Georg Strobl, Buhl; Klaus Sander, Hofingen, both of Germany

[73] Assignee: Robert Bosch G.m.b.H., Stuttgart, Germany

[22] Filed: May 13, 1971

[21] Appl. No.: 143,067

[30] Foreign Application Priority Data

June 6, 1970 Germany..................G 70 21 203.2

[52] U.S. Cl................317/13 C, 317/40 R, 317/41, 310/239, 310/248, 318/473
[51] Int. Cl.........................H02h 7/06, H02h 5/04
[58] Field of Search.............317/13 B, 13 C, 40 R, 41; 318/473; 340/253 A, 22 AR; 310/239, 248, 249

[56] References Cited

UNITED STATES PATENTS 3,444,409  5/1969  Latta.....................310/239
2,758,255  8/1956  Lytle.....................317/13 B Primary Examiner—L. T. Hix
Assistant Examiner—Harvey Fendelman
Attorney—Michael S. Striker

[57] ABSTRACT

A heat responsive device, such as a bimetallic switch or a thermo couple, is positioned within a brush of the motor. The opening or closing of the switch or the voltage from the thermo couple, operates a relay or an electronic switch, such as a thyristor to disconnect the motor from current when the temperature, as an indication that the maximum permissible operating temperature of the motor has been exceeded, within the brush rises above a certain value.

6 Claims, 4 Drawing Figures

Patented May 30, 1972

3,666,990

INVENTORS
GEORG STROBL
KLAUS SANDER

BY

ATTORNEY

3,666,990

OVERLOAD PROTECTOR FOR ELECTRIC MOTORS WITH BRUSHES

BACKGROUND OF THE INVENTION

The invention relates to a temperature dependent overload protector for electric motors, particularly for small output motors, that use brushes. A heat responsive device directly or indirectly disconnects the motor from current.

Known electric motors use a bimetallic switch as the heat responsive device, the switch being arranged in the main field winding. The bimetallic switch is operated by the heat developed in the field winding. When the maximum permissible winding temperature is reached, the bimetallic switch opens the current circuit of the motor.

This arrangement of the prior art does not always protect against overload. With motors subjected to radically changing loads, as is the case for starting motors for internal combustion engines, it has been observed that the commutator can become damaged — the commutator lugs become unsoldered because of excessive heat rise within the winding — without the protector disconnecting the motor from current.

If the motor is out in the open, the protector also may not respond, because the ambient temperature prevents the bimetallic switch from correctly sensing the temperature within the winding.

With motors that do not have field windings, such as permanent magnet motors, it is, of course, quite impossible to use an overload protector of this sort.

SUMMARY OF THE INVENTION

An object of the invention is a heat dependent overload protector that, under all operating conditions, prevents damage to the motor caused by excessive temperature rise, and that can be used with all motors that employ brushes.

Briefly, the invention consists of switch means connecting the motor to current and heat responsive means positioned within a brush of the motor and connected to the switch means for causing the switch means to open when a permissible motor operating temperature is exceeded as determined by the temperature within the brush.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
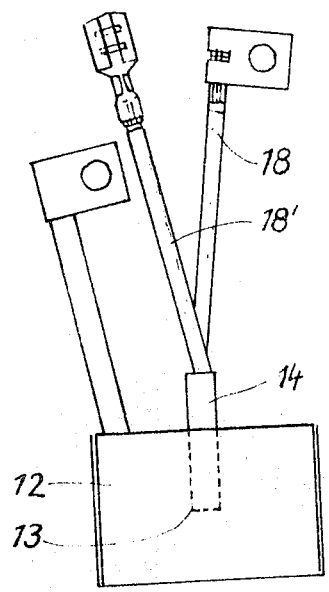
FIG. 1 is a side view of a brush of an electric motor, the brush incorporating a bimetallic switch.
Figure 2:
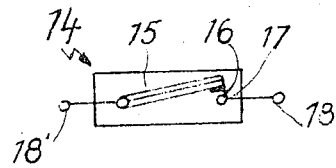
FIG. 2 is a side view schematically showing the bimetallic switch.

A brush 12 of a direct current series wound motor 11 is provided with a bore 13, there being fixed in this bore, in any suitable way, such as by gluing, a heat responsive device. In accordance with the present embodiment, this device is constructed as a small, conventional, bimetallic switch 14. The bimetallic switch 14 includes a bimetallic spring 15, the movable end of which carries a contact 16 that cooperates with a stationary contact 17.

The terminal 18 of the bimetallic switch 14 is connected to one pole of a direct current source 19, the other terminal 18' of the bimetallic switch being connected through the solenoid 20 of a switching relay 21 to the other pole of the source. The stationary contact 2 of the switching relay 21 is connected in the current circuit of the motor 11, which circuit leads from the positive pole P of the direct current circuit to the series winding 23, the brush 12', the armature 24, the brush 12, and the negative pole N. The motor 11 and the protective arrangement of the invention are simultaneously connected by a switch 10'.

The overload protector of the invention operates in the following manner. During normal operation of the motor 11, the bimetallic switch 14 is open. As the temperature within the brush 12 rises, the movable end of the bimetallic spring 15 approaches the contact 17 until, at some temperature that is equal to the maximum permissible operating temperature of the motor, the contact 16 touches the opposed contact 17, closing the bimetallic switch 14. Consequently, the solenoid circuit of the switching relay 21 is closed; the solenoid 20 is energized, the switching relay 21 thereby opening the normally closed contact 22 and disconnecting the motor 11 from current. After the temperature falls below the maximum permissible value, the bimetallic switch 14 opens, the relay 21 is released, and the motor 11 again is energized.

Figure 3:
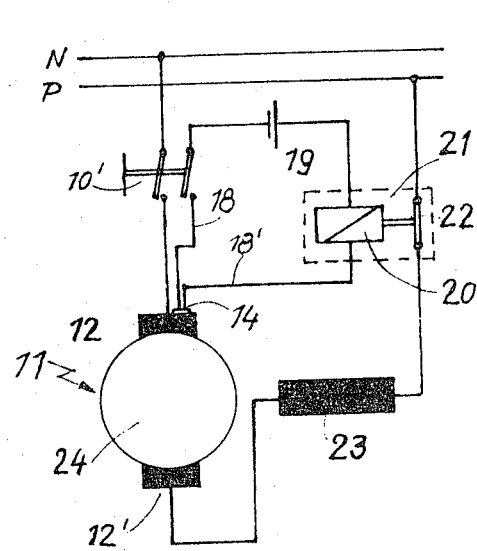
FIG. 3 is a circuit diagram of an electric motor connected to the overload protector of the invention.

If the protective overload device of the invention is used with a starting motor for an internal combustion engine, it is better because of the short operating period of the motor, if the bimetallic switch is normally closed and if it opens only when the maximum permissible operating temperature of the motor is exceeded. The bimetallic switch is connected in the solenoid circuit of the relay, as in the embodiment illustrated in FIG. 3, the relay having a contact that is closed only when the relay is energized. This contact is connected in the current circuit of the motor 11.

When the starting switch is closed, the switching relay is energized and the contact of the relay is closed. When the maximum permissible operating temperature of the starting motor is exceeded, the bimetallic switch opens and breaks the solenoid circuit of the relay, which latter becomes deenergized. The opening of the relay contact disconnects the motor from current.

In accordance with the invention, the overload protector, instead of disconnecting the motor from current, can operate a visual or acoustical warning device when the permissible operating temperature is exceeded.

Figure 4:
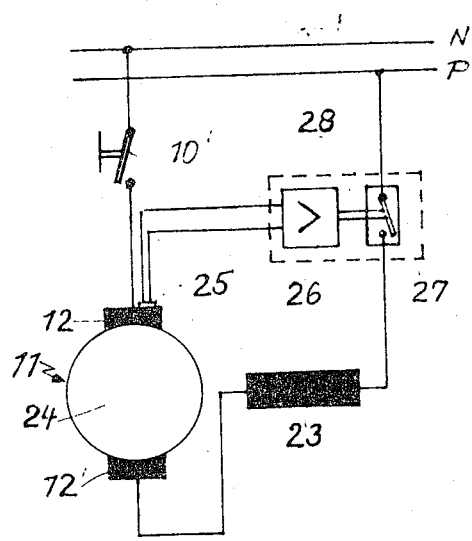
FIG. 4 is a wiring diagram of a motor connected to a second embodiment of the overload protector of the invention.

FIG. 4 illustrates another embodiment of the invention in which the heat responsive device is constructed as a thermoelement 25, such as a thermo couple. The thermoelement 25 is connected by an amplifier 26 to the control circuit of an electronic switch 27, such as a thyristor. The switch proper 27 and the amplifier 26 together form a unit that constitutes a switching device 28.

The thermoelement 25 delivers a voltage that is dependent on the temperature within the brush 12, the amplifier 26 increasing the strength of this voltage and conducting it to the control circuit of the electronic switch 27. If the voltage from the thermoelement 25 exceeds a certain value, the switching unit 28 is operated and the switch 27 disconnects the motor from the current source P and N.

The arrangement of the invention insures that the motor is reliably protected from overload, since the temperature within the brush, caused by the current drawn by the motor, is an indication of the temperature of all the other parts of the motor under all operating conditions.

It will be understood that each of the elements described above, or two or more together, may also find a useful application in other types of circuits differing from the types described above.

While the invention has been illustrated and described as embodied in an overload protector for electric motors with brushes, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A temperature dependent overload protector for electric motors with brushes, comprising, in combination, switch means connecting the motor to current; and heat responsive means positioned within a brush of the motor and connected to said switch means for causing said switch means to open when a permissible motor operating temperature is exceeded as determined by the temperature within the brush.

2. An overload protector as defined in claim 1, wherein said heat responsive means is a bimetallic switch operated in dependence on the temperature within the brush.

3. An overload protector as defined in claim 2, wherein said switch means includes relay means having contact means connected in the current circuit of the motor and a solenoid for operating said contact means, said bimetallic switch being connected to said solenoid.

4. An overload protector as defined in claim 1, wherein said heat responsive means is means for generating a voltage in dependence on the temperature within the brush.

5. An overload protector as defined in claim 4, further including control means for operating said switch means, and wherein the means for generating a temperature dependent voltage is connected to said control means for causing operation of said switch means in dependence on the temperature within the brush.

6. An overload protector as defined in claim 5, wherein said control means and switch means are electronic.

* * * * *